G. BORDEN, Jr.
Vacuum Pan.
No. 2,103.
Reissued Nov. 14. 1865.
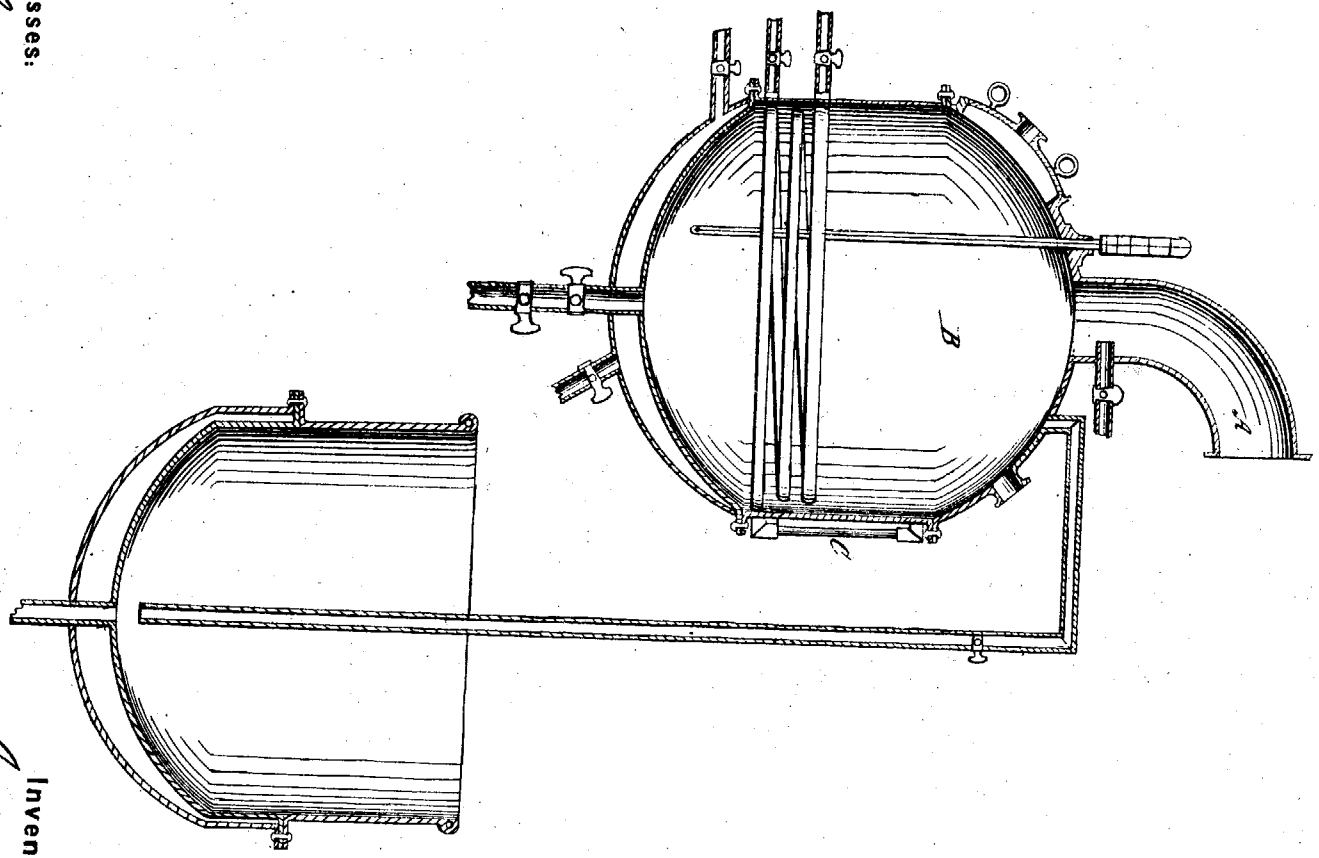
Witnesses:
Thos Leeds
Lewis B. Bridge
Inventor,
Gail Borden Jr.
By D. W. Cogswell,
Atty's.

UNITED STATES PATENT OFFICE.

GAIL BORDEN, OF AMERICA, NEW YORK.

IMPROVEMENT IN CONDENSING MILK.

Specification forming part of Letters Patent No. 15,553, dated August 19, 1856; Reissue No. 1,306, dated May 13, 1862; Reissue No. 1,398, dated February 10, 1863; Reissue No. 2,103, dated November 14, 1865.

*To all whom it may concern:*

Be it known that I, GAIL BORDEN, of America, in the county of Dutchess and State of New York, have invented a new and useful Process or Method of Operation for Concentrating and Preserving Milk; and I declare that the following is a full, clear, and exact description of the same.

The nature of my invention will be best understood by attending to the following considerations concerning the subject to which it relates. Milk, like blood, is what may be termed a "living" fluid—that is to say, the sources from which it is derived, whether animal or vegetable, are always found possessed of vitality, and in this life it seems to participate so long as it remains connected with the bodies which produce or contain it, while as soon as it is separated from them it begins to undergo change and die. All organic substances are injuriously affected by the atmosphere, and are liable to reaction among their constituent elements; hence the deterioration of milk is greatly influenced and accelerated, though not wholly caused, by exposure to air. It is doubtless for these reasons that nature provides means for transferring the milk of animals to their young by causing it to pass through a vacuum. This demonstrates that the less milk is suffered to be acted upon by the external air the better is its condition, and this fact has suggested the first portion of my improved process, and has led me to perform the concentration, which is one object of my invention, in such a manner as to exclude the milk as much as possible from contact with the atmosphere while it is being concentrated; and for this purpose I cause the concentrating process to be performed in a vacuum-pan in the mode hereinafter described. It is well known that milk in its natural or crude state contains considerable quantities of albumen. This albumen possesses the property of being coagulable by heat, and when the heat of the vacuum process is applied to milk which has been put in its natural or crude state into a vacuum-vessel the albuminous particles of the milk commence to be coagulated; and I have ascertained that in the course of being coagulated they will so coat the interior surface of the vacuum-pan that, unless measures are taken to prevent this coating, the concentration cannot be carried on *in vacuo* to any practical or desirable extent. It is therefore indispensable to provide means for obviating this injurious consequence, and to this relates the second part of my improved process. To accomplish this I, after long-continued experiments, ascertained that, if the albuminous particles of the crude milk be sufficiently coagulated by application to them of the required heat for that purpose before running the milk into the vacuum-pan, the detrimental result of which I have spoken will be entirely prevented. This preliminary heating coagulates and, as it were, rearranges the greater portion of the albumen, and by being performed away from the vacuum-pan, and in a vessel in which no concentration is to take place, and from which, moreover, any part of the coagulated albumen which may adhere to its sides can be easily removed, no injury can arise from any coating produced. After this preliminary coagulating has been performed, the subsequent heating of the vacuum process is found not to cause any coating, or, at least, no injurious coating, of the vaccum-vessel. In addition, this preparatory heating so changes the relation of the remaining albuminous particles to the other constituents of the milk that the nutritive properties of the former are retained; and at the same time, as the albumen of milk, equally with that of other bodies, has a strong affinity for the oxygen of the atmosphere, the effect of which is to hasten the decay of the milk, it is found that this heating of the latter, to coagulate its albumen previous to the concentration—a thing which cannot effectually be done in the vacuum-pan—greatly enhances the preservative qualities of the concentrated product.

It is upon these two principles—that is to say, the evaporating of the milk away from the atmosphere, and the preliminary congulation and rearrangement of the albuminous particles—that my improved process is based; and to enable those skilled in the art to which the same relates to practice my invention, I will proceed to describe it in detail. I would, however, permise that although I have in the annexed drawings represented apparatus for carrying out my process, I have done so only for the purpose of making my description more complete. I do not make claim to the machinery therein shown, which is not new, nor to any other, and almost any of several well-known devices for heating liquids and boiling them *in vacuo* will answer the purpose. The thing which I have invented is the process itself, and the working of this is in no way dependent upon any particular form of apparatus.

B is the vacuum-boiler or pan for concentrating the milk. A is a pipe connected with said vacuum-boiler, and also with an air-pump and condenser, as commonly employed by sugar-refiners. The milk is boiled and concentrated in the vessel B by means of steam or other heat applied in any of the well-known methods adopted in connection with the use of an air-pump and condenser. When a steam-pipe is employed inside of the boiler, it should be so coiled that every part of it may be reached by the hands, so that it may be readily and thoroughly cleansed. Both a steam-pipe and a jacket may be employed at the same time. A thermometer is inserted into the boiler, and a vacuum-gage connected with it to indicate the temperature of the contained fluid and the extent of the vacuum.

The milk to be concentrated *in vacuo* is to be first heated, as before stated, as soon as practicable after milking. I prefer to do this in tin, brass, or copper cans heated in a bath of boiling water to a temperature varying from 150° to 200° Fahrenheit, according to whether plain condensed milk—that is, milk which is uncombined with anything designed to preserve it, or whether what is termed "preserved milk" is to be manufactured; but the heating may be done in any other convenient apparatus; or the heat may be applied otherwise than by means of boiling water; and although I prefer the range of temperature just stated, any other temperature which will effect the requisite coagulation of the abumen will answer the purpose, it being the preliminary coagulation itself, and not any special temperature for effecting it, which constitutes the gist of this part of my invention. I prefer to next strain the milk through a fine wire-cloth or other strainer into a metal reservoir or vessel provided with a steam-jacket, in which the milk can be brought, when desired, to a boiling-point, and from which it may be drawn into the vacuum-boiler by means of atmospheric pressure through a pipe leading into the pan. If desired, the milk may be strained into a wooden vessel; and if this be done it will be found best to provide the latter with a steam-coil. This preparatory straining is designed only to remove any frothy scum or specks which may be in the milk or upon its surface; but it is not indispensable, and may be omitted if preferred.

The working of the vacuum-boiler is conducted in a manner similar to that employed in using vacuum-pans in the manufacture of refined sugar, except that I find it best to first place a small quantity of the milk in the pan, and, after the boiling has commenced, to let the milk run in from the reservoir by a gradually-flowing stream, regulated in quantity in such a manner as always, or during the principal part of the evaporating process, to maintain the fluid in the boiler B at about the same consistency or state of spissitude. For the purpose of ascertaining the degree of concentration at any time, the discharge-pipe at the bottom of the boiler is provided with two cocks, placed from two to four inches apart, according to the size of the pipe. Upon opening the upper cock the fluid will descend to the lower one. The upper cock may then be closed and the lower one opened, thus letting out a small quantity of the milk, from which the amount of concentration can be determined. I find that the proper degree of consistency is best ascertained by cooling this trial portion of milk to a given temperature, which is quickest done in a tin vessel placed in a mixture of ice and salt, its contents being stirred.

The better to regulate the quantity of milk in the boiler, the latter is provided with a glass gage, G, on or beside which figures representing quarts or gallons are marked. After the milk has been let into the boiler, and when reduced in quantity to any desired degree, as shown by the gage, I find it decidedly preferable to increase the heat of, or, in other words, superheat, the milk in the pan by gradually breaking or reducing the vacuum until the temperature rises from 195° to 205° Fahrenheit. I then take off the steam and let the vacuum again increase, when the evaporation recommences, and may be continued until the milk reaches the proper consistency. If, upon trial, it is not found thick enough, steam may be again applied slowly, until further trials indicate that the operation is complete. If found too thick, hot water, to be provided in the reservoir heretofore mentioned or otherwise, may be let into the pan to reduce its contents to a proper consistency while the ebullition is still going on. By thus evaporating milk after superheating it, it is found that much of the odor of the cow and other disagreeable odors are evolved and sent off; and in making plain condensed or concentrated milk, the extra heating in the vacuum-pan is useful to prevent the granulation or crystallization of the sugar of milk, and to insure greater uniformity of consistency. In concentrating milk which is combined with sugar, coffee, or other extracts, this process of extra heating in the pan may be dispensed with, if the milk be sufficiently heated before concentration.

To prevent the concentrated fluid from sticking and baking to the vacuum-pan and coil, when it is removed, which is due to the peculiarly adhesive nature of condensed milk, I connect water-pipes with the steam-pipes in such a manner that, as soon as the steam is shut off and before the vacuum is broken, cold water may be forced into the jacket and coil, and when they are thus cooled, the adhesion of the milk to them does not take place. I sometimes find it necessary to employ this cooling process during other portions of the operation, especially toward the close of a boiling, should the milk not cover the upper part of the coil. Where this is the case, although the application of steam is still continued in the jacket, the cold water is let in to the coil, and this effectually prevents the sticking of the milk.

I do not confine myself to any particular degree of concentration of milk. It may be carried as far as desired; but for plain condensed milk I prefer to reduce it from seventy-five to eighty per cent., varying, however, according to the season or food of the animal giving it. When the milk is combined with sugar or extract of coffee, &c., it may with benefit be reduced still further.

When the process of concentration is completed, the best mode of procedure is to transfer the milk directly from the pan into tin cans, usually holding forty quarts, but filled only about four-fifths full. These are immediately put into a vat of cold water; or ice may be employed in warm weather. To hasten the cooling, I sometimes employ tin cylinders, of the full length of the can and four or five inches in diameter, containing six or eight quarts. Into these broken ice is put from time to time, the water being drawn out by a siphon or pump, and the ice is replenished as may be necessary. This cylinder is employed as a stirrer as well as a refrigerator. For plain concentrated milk the cooling may be continued until the milk is reduced in temperature below 50° Fahrenheit. In cooling concentrated milk combined with sugar, coffee, or other extracts, it is not necessary to reduce the temperature lower than 56°, which may be done without the cylinders, common stirrers being used.

The concentrated milk produced by my process is prepared for consumption by adding water to it in proportion to the degree of concentration to which it has been subjected, and it will then produce about the same quantity of cream as the original milk. It is also rendered preservative and soluble without the use of sugar or any antiseptic, which is a thing that has never, to my knowledge, been effected before.

Besides other advantages of concentrating milk *in vacuo*, there is no means yet discovered by which evaporation is so rapidly and safely conducted. Milk concentrated by my plan can be afforded for a much less price than that for which other concentrated milk has heretofore been sold. My process will enable milk to come into as general and common use as sugar.

Having thus described my invention, I would state that I am aware that it is, and long has been, very common to scald milk, both among housewives, for the purpose of preserving it, and among others, as a portion of certain processes employed in preparing milk for market. My preliminary coagulating of the albumen, while it is in part designed, as already stated, to secure the retention of the nutritive properties of the milk and to increase its preservative qualities, has in view a matter entirely distinct from these things—namely, the prevention of the coating of the vacuum-pan. However, I do not of course claim, broadly, the heating of milk.

I am likewise aware that others, before my invention, have conceived the idea of evaporating milk *in vacuo*, and that several patents have been granted for processes which profess to successfully effect this result, and also for still other modes which purport to concentrate milk; but of these processes those which may be said to constitute a first class are merely such as use a vacuum apparatus for boiling the milk, unaccompanied by any provision whatever for first preparing it to be concentrated in the pan by properly heating the albuminous particles. Those which may be said to constitute a second class are such as do not employ a vacuum apparatus at all, but use merely an open pan combined with some arrangement for stirring the contained milk, which obviously has nothing in common with my process.

I do not claim the evaporation of milk in a vacuum, considered by itself; but

What I claim as my invention, and desire to secure by Letters Patent, is—

1. The within-described process or method of operation for concentrating and preserving milk by means of coagulating and rearranging the albuminous particles, in combination with the evaporation of the fluid *in vacuo*.

2. The preparatory coagulating and rearranging of the albuminous particles, when this is done as a part of the operation of making concentrated or condensed milk.

GAIL BORDEN.

Witnesses:
L. D. COZZENS,
J. W. BUTLER.